United States Patent [19]
Gloor et al.

[11] 3,770,959
[45] Nov. 6, 1973

[54] METHODS AND MEANS FOR MONITORING ECCENTRICITIES OF COAXIAL MEMBERS

[75] Inventors: Karl Gloor, Zollikon; Eugen Halter, Zuerich, both of Switzerland

[73] Assignee: Schweissindustrie Oerlikon Buhrle AG, Zuerich, Switzerland

[22] Filed: June 3, 1971

[21] Appl. No.: 149,759

[30] Foreign Application Priority Data
June 4, 1970  Switzerland.......................... 8400/70

[52] U.S. Cl. ..................250/375, 250/88, 250/393
[51] Int. Cl. ........................................... G01n 23/02
[58] Field of Search ............................... 250/83.3 D

[56] References Cited
UNITED STATES PATENTS

| | | | |
|---|---|---|---|
| 3,148,279 | 9/1964 | Skala | 250/83.3 D |
| 3,390,769 | 7/1968 | Tatham et al. | 250/83.3 D X |
| 3,609,368 | 9/1971 | Knorr et al. | 250/83.3 D X |
| 3,611,408 | 10/1971 | Shoemaker et al. | 250/83.3 D X |
| 3,654,468 | 4/1972 | Shah | 250/83.3 D X |

*Primary Examiner*—Archie R. Borchelt
*Attorney*—Toren & McGeady

[57] ABSTRACT

As welding electrodes are mass-produced, the mean eccentricity of a number of the electrodes' wires with respect to their surrounding sheaths is monitored, by sequentially passing parallel ones of the electrodes radially past an X-ray source. For each electrode a comparison is made of the X-ray radiation absorbed by the sheath on one side of the wire with that on the other side of the wire. The absorption measurements indicate when the sheath begins to pass the source, when the rod begins to pass the source, when the rod stops passing the source, and when the sheath stops passing the source. The absolute values of the comparisons are totaled to obtain an indication of the average eccentricity.

33 Claims, 4 Drawing Figures

000
METHODS AND MEANS FOR MONITORING ECCENTRICITIES OF COAXIAL MEMBERS

BACKGROUND OF THE INVENTION

This invention relates to mass production of devices including coaxial portions and the monitoring of their eccentricities, and particularly to the monitoring of the eccentricities of electric welding rods or electrodes composed of a central metallic welding wire which is surrounded by a welding powder sheath that is as coaxial as possible relative to the wire.

Such electric welding electrodes are usually produced in large quantities, such as 1000 electrodes/min., with cylindrical metallic welding wires and surrounding powder sheaths. The electrodes produced are generally moved on a high speed conveyor belt where they are aligned substantially parallel with each other and transverse to the direction of movement of the belt.

Because of the manufacturing methods used, the individual electrodes usually exhibit a certain amount of eccentricity E. That is to say the welding wire and the welding powder sheath are not always exactly coaxial relative to each other but are eccentric. The eccentricity E, which is a measure for the deviation from the coaxial condition is defined as the distance of the radial centers of the two cylinders formed by the welding wire and the welding powder sheath.

The radial direction of the individual eccentricities of the electrodes or rods as they are moved onto the moving belt is evenly distributed when considered on a statistical basis. The maximum eccentricity tolerated in the manufacture should not be exceeded, if possible. Otherwise the quality of the electrodes will suffer.

In order to supervise the machine and the production apparatus, the statistically average eccentricity of the welding electrodes should be tested non-destructively. This would allow the production of a more satisfactory product.

In the past, a statistical random test was used. A test electrode or rod was removed by hand from the electrodes on the moving belt at regular intervals. The azimuthal variation of the eccentricity was determined by the variations in the permeability exhibited by the electrodes in a constant stationary magnetic field. This variation was noted by turning the electrode by hand about its longitudinal axis. This method was used to determine whether the eccentricity was within a desired range of tolerance.

This method of testing and measuring the statistical mean value of the eccentricity of the electrodes has a number of shortcomings. For example, it can only be used with welding rods utilizing ferromagnetic material. For example, it could not be used with welding rods using aluminum wires. The method of testing a random sample was somewhat subjective. This resulted in systematic subjective averaging errors. When this system is used with great production numbers, the interval between the random tests with a fixed number of testers becomes too great. That is to say, the results become less accurate with a large number of rods. On the other hand, to achieve constantly accurate results requires a great number of testers. It becomes too expensive. Moreover, this manual random sampling and testing cannot be automated and is thus uneconomical.

An object of the present invention is to eliminate the above-described disadvantages.

Another object of the invention is to improve such measuring systems.

SUMMARY OF THE INVENTION

According to a feature of the invention, these objects are attained and the disadvantages obviated by sequentially moving individual rods in a direction having a radial component past an energy source that penetrates the sheaths differently than the wires, and, after sensing the energy penetrating the sheath on the leading radial side of the wire and then subtracting the radiation passing through the trailing side of each rod so as to achieve a comparison for each rod, adding the absolute values of the comparisons for a predetermined number of rods.

According to another feature of the invention, the number of rods are counted and the addition stopped after the predetermined number of rods.

According to still another feature of the invention, the amount of penetration is measured by obtaining an indication of the distance over which the sensor senses penetration through the sheath on the leading radial side of the wire and on the trailing radial side of the wire.

According to yet another feature of the invention, the penetration is measured by establishing thresholds of penetration separating the penetration of the sheaths and the wires.

According to still another feature of the invention, the energy source is composed of an X-ray and the penetration is measured by an ionization chamber that measures the absorptions of the sheaths and the wires.

According to still another feature of the invention, a first threshold is established to indicate that the absorption exceeds the absorption of the medium surrounding the rods to thereby denote that the sheath is absorbing the X-ray radiation, and a second higher absorption threshold is established to indicate that the wire is passing under the source and absorbing the radiation.

According to still another feature of the invention, the distance over which the ionization chamber measures the absorption of the sheaths as the rods pass the source, is determined by a counter that counts pulses whose rate depends upon the speed at which the belt moves the rods past the source.

According to yet another feature of the invention, the counter counts up for pulses that occur during passage of the leading radial side of the sheath and counts down for pulses which occur as the trailing radial side of the sheath passes the source.

According to another feature of the invention, an adding device adds the absolute value of each rod's net number of pulses and after a predetermined number of rods have been measured, the total is displayed and erased for a new count.

Because of these features, all types of welding electrodes whose welding wires and welding powder sheaths permit different penetrations or exhibit different absorption capacities for X-rays, or other types of radiation can be tested. Since the material density of the welding wire, the capacity of the sheath to absorb X-rays is always different than that of the wire for all possible types of electrodes. Thus the invention is suitable for monitoring electrodes using any material, not only those using ferromagnetic welding wires. The invention minimizes subjective measuring errors that occur as a result of manual random testing. The invention carries out the monitoring automatically and can be used without additional personnel. The mean eccentricity can be ascertained over any selected number of electrodes. Likewise, the velocity of the feed of the electrodes can be selected at random.

Furthermore the measuring values are determined, according to the features of the invention, while the welding electrodes move on a belt. The method according to the invention is therefore suitable for use with systems producing large or small numbers of electrodes. The invention yields mean values which are independent of the number.

An advantage of the method according to the invention is that the number of electrodes not used for ascertaining the mean value can be counted automatically. In addition, the thickness of the sheath can be supervised by additional means. This is important in order to replace the sheathing nozzle when it is worn out, as may be required for economic or technical reasons.

These and other features of the invention are pointed out in the claims forming a part of this specification. Other objects and advantages of the invention will become known from the following detailed description when read in light of the accompanying drawings.

DESCRIPTION OF PREFERRED EMBODIMENTS

Figure 1:
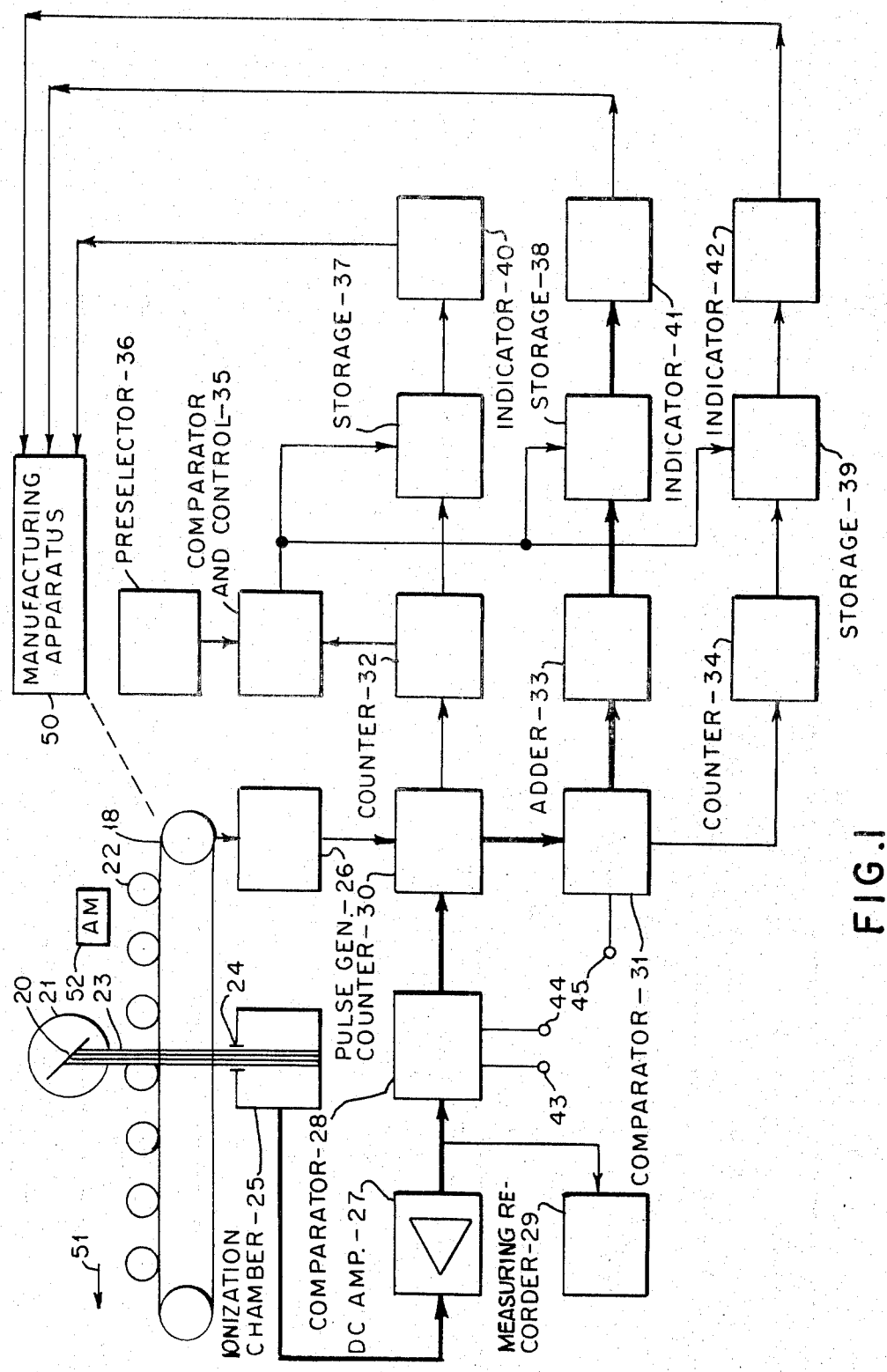
FIG. 1 is a partially schematic and partially block diagram of a welding rod eccentricity monitoring system embodying features of the invention.

In FIG. 1 a continuously moving endless belt 18 carries a number of welding electrodes 22 emerging from a manufacturing apparatus 50, in the direction indicated by the arrow 51. The belt 18 carries each of the electrodes which extend transverse to the direction of the movement of the belt 18 past a direct current X-ray source 21. The latter has a narrow focal point 20 for producing a narrow cone of X-rays 23. The source has substantial power so as to produce largely intensive rays. In the embodiment illustrated in FIG. 1, the focal point has an extension of less than 0.25 mm with an electron current of 2.5mA and a tube voltage of 100kV. The cone of rays 23 are diaphragmed narrowly enough so as to pass perpendicularly relative to the electrodes 22 on the conveyor belt 18. The electrodes 22 extend parallel to each other, and as stated, transverse to the direction of the feed of the belt.

An ionization chamber 24 which is filled with air or xenon generates an ionic current I which corresponds at any moment to the intensity of the radiation passing through a diaphragm 24 in the ionization chamber. A direct-current amplifier 27 amplifies the current I.

Figure 2:
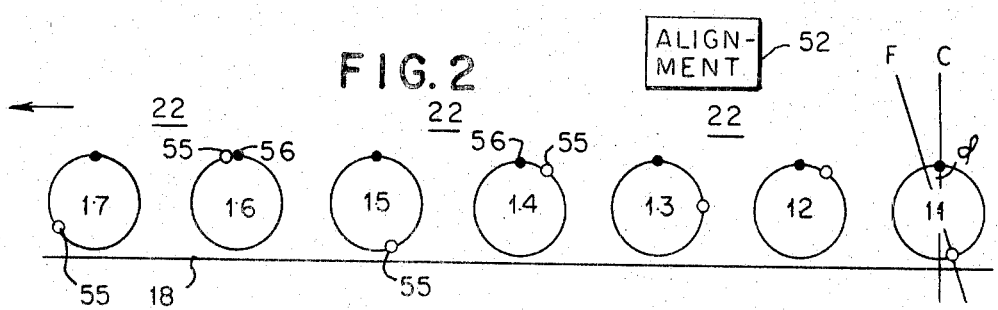
FIG. 2 is a schematic illustration showing electrodes carried by a conveyor belt and indicating different azimuthal positions or radial directions of eccentricities in the respective rods.

FIG. 2 illustrates seven of the electrodes 22 on the conveyor belt 18. In FIG. 2, the electrodes are individually identified as electrodes 11 – 17. Again, the direction of the motion of the belt is from right to left, as indicated by the arrow. The electrodes extend transverse to the direction of the movement of the belt 18, and are substantially parallel to each other. They come directly from the manufacturing apparatus 50 and can, accidentally, touch each other depending upon the ejection rate. Alignment means 52, which are also illustrated in FIG. 1, align the electrodes parallel to each other before they pass the source 21.

Figure 3:
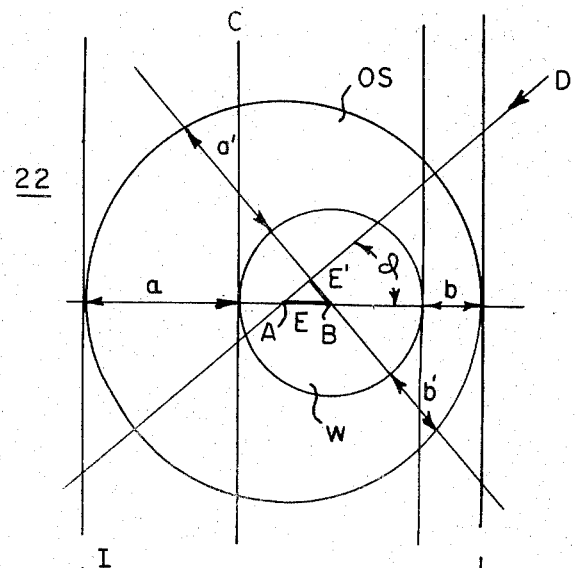
FIG. 3 is a schematic diagram illustrating the cross-section through a welding electrode and showing an example of the eccentricity of the wire within the electrode.

FIG. 3 illustrates a detailed cross-section of one of these electrodes. Here a cylindrical outer sheath OS surrounds a cylindrical wire W. The outer sheath is composed of a powder material which is sintered or otherwise caked onto the wire W. The electrode 22 exhibits an eccentricity E. The latter represents the shift of the center B of the wire W from the center A of the outer sheath OS. Thus the eccentricity E really represents the eccentricity of the wire W within the sheath OS.

The eccentricity E is a substantially unavoidable effect. The desired result from production is an absence of eccentricity, that is an outer sheath OS coaxially surrounding the wire W. Under those circumstances the center A coincides with the center B. However, because of manufacturing tolerances, electrodes 22 usually exhibit the eccentricity illustrated in FIG. 3. In a manufacturing apparatus, such as the apparatus 50, the magnitudes of the eccentricities of large numbers of electrodes follow a substantially Gaussian distribution about a specific mean value with a given variance.

Because of the manner in which the electrodes are ejected from the manufacturing apparatus 50, the radial directions of the eccentricities are distributed almost evenly on a statistical basis, as indicated by tests. FIG. 2 illustrates a number of directions that the eccentricities might exhibit as they are ejected from the manufacturing apparatus 50. In FIG. 2, the open circles 55 illustrate the sample directions of the eccentricities in the electrodes 11 – 17 with respect to the centers of these electrodes, while the darkened spots 56 indicate the tops of the electrodes. Thus, the darkened spots represent the intersection of a vertical line C through the center of an electrode with the outer periphery of the sheath OS. In the electrode 11 the direction of the eccentricity is explicitly indicated by a straight line F through the center of the electrode 11 and the small circle 55. The line C illustrates the fixed vertical direction of the cone of X-rays. As clearly seen with respect to electrode 11, the relative position of the accidental eccentricity directions to the fixed directions of the radiation of the cone of X-rays is indicated by the angle $\phi$. It follows that the angle $\phi$ is evenly distributed statistically.

Thus, as the electrodes 22 pass the cone 23 from the source 21, the eccentricity can extend in anyone of a number of directions. The effect of extending in one direction or another has a considerable effect upon the measurement. Thus, for example, as an electrode, such as the one shown in FIG. 3, passes through the cone 23, the ionization chamber 25 first responds to the penetration of the portion a of the outer sheath OS. The current produced by the ionization chamber would thus follow the path indicated by the absorption curve in FIG. 4. Initially, just before the electrode enters the range of the cone 23, the current I produced by the ionization chamber is quite high and indicative of substantially no absorption. As the electrode enters the cone 23 the sheath OS begins to absorb some of the energy in the portion a. This absorption increases so that the current I produced by the ionization chamber 25 decreases. When the core wire W first enters the narrow cone at the time $T_2$, the current I suddenly decreases below a value $I_2$. This is indicative of the sudden jump in absorption by the core wire W. At the time $T_3$ when the core wire emerges from the narrow cone 23, the current I jumps rapidly back to a higher value indicating that only the sheath is absorbing energy. This occurs in the portion of the sheath $b$ of FIG. 3. When the rod emerges from the cone 23 entirely, the current I from the chamber 25 again jumps to the zero absorption value.

Since the absorption rate as the electrode enters the cone 23 does not drop discontinuously, a value $I_1$ is chosen beyond which or below which the sheath is presumed to have entered the cone at the time $T_1$ and above which the sheath is presumed to have left the cone 23 at the time $T_4$. The value $I_2$ is selected to coincide with approximately the center of the discontinuities occurring as the wire W enters and leaves the cone 23. These discontinuities occur at times $T_2$ and $T_3$.

The measurement of time from $T_1$ to $T_2$ and $T_3$ to $T_4$ produces two values, $a'_m$ and $b'_m$, which are approximately equal to a and b. As can be seen from FIG. 3, when the eccentricity is oriented in the direction shown, the eccentricity of the electrode is given by $$E = a - b/2$$

Thus an indication of $(a'_m - b'_m)/2$ constitutes a substantial approximation of the eccentricity E. However, it can be seen that if the electrode is rotated and the cone radiates energy from the direction D as shown in FIG. 3, values $a'$ and $b'$ are obtained from the absorption measurements. The direction D, however, forms an angle 2.$\phi$ with the eccentricity. For this reason, an absorption measurement crresponding to $(a'_m - b'_m)/2$ does not yield a value corresponding to the eccentricity E. Rather it yields the projection E' in the direction D. We thus have $$E' := (a' - b')/2 = E \cdot \sin \phi.$$

Actually, the eccentricity varies as shown in FIG. 2 and the direction of radiation is fixed. But in any case, except for the peculiar case shown in FIG. 3, where the radiation in the direction C is perpendicular to the eccentricity E, the absorption measurement always measures the projected eccentricity E'.

Since the electrode directions are evenly distributed, the statistical mean value of the various projected eccentricities with a continuous angle $\phi$ is obtained by the integration of the equation (2) for E' over the angle $\phi$ in an interval from 0 to $\pi/2$ with the statistical weight $1/(\pi/2)$. Thus, if a bracket [ ] characterizes the approximation to the mean, we have $$\langle E' \rangle = \frac{2E}{\pi} \int \frac{\pi}{2} \sin \varphi d\varphi = \frac{2E}{\pi}.$$

Thus the eccentricity E of an electrode has the value $$E = \pi/2 \ [\ E'\ ].$$

This continuous averaging can be meaningful only for a large number of electrodes and a large number of directions $\phi$. Thus, the validity of the measuring method is ensured by satisfying these conditions.

If N is the number of measurements and the number of averaged electrodes, respectively, N = 100 will yield satisfactory results. On the other hand, the statistical averaging is absolutely necessary since the individual angle of the eccentricity direction is neither known nor of interest.

In each absorption measurement we obtain sections $a'_m, b'_m$ ($m = 1,2, \ldots$ N) for different angles of $\phi$ with the corresponding $E'_m$. The most likely value for E' is approximated by the arithmetic mean of the positive individual measurements $E'_m$. If the arithmetic mean is identified by the bar, then $$\overline{E'} = \frac{1}{2N} \sum_{m=1}^{N} |a'_m - b'_m|.$$

Combining the equation (2) with equation (5) produces $$\overline{E'} = \frac{1}{N} \sum_{m=1}^{N} E_m |\sin \phi_m|.$$

Continuous averaging according to the equation (3) analogously yields $$[\overline{E'}] = 2/\pi \overline{E}.$$

The mean eccentricity follows from equation (5) which yields $$\overline{E} = \frac{\pi}{4} \frac{1}{N} \sum_{m=1}^{N} |a'_m - b'_m|.$$

Equation (8) is the basis for the new method.

Figure 4:
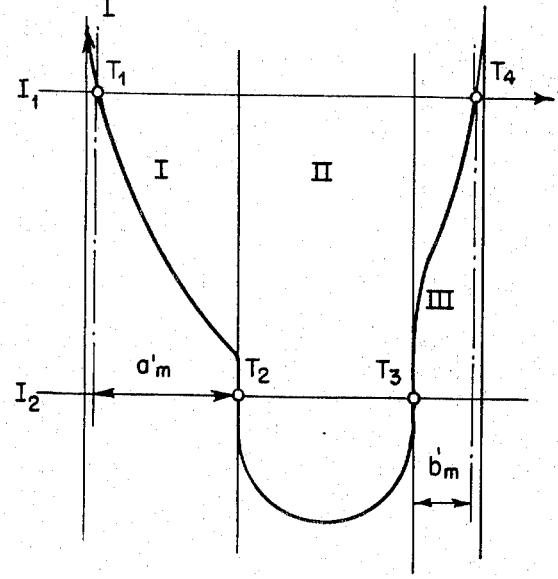
FIG. 4 is a current-time diagram illustrating the absorption experienced by radiation as an electrode, such as the one of FIG. 3 passes a source of radiation.

FIG. 4 specifically shows the absorption curve for the m-th measurement produced by the ionic current in the ionization chamber 25. The ionic current I generated in the ionization chamber corresponds to the intensity variation of the X-rays traversing the electrode as amplified with the d-c amplifier 27. This current I when applied to a measuring recorder 29, yields the curve illustrated in FIG. 4 as a function of time T.

In the curve of FIG. 4 we can clearly see three regions, I, II and III. The two outer regions I and III, which determine the sections $a'_m$ and $b'_m$ correspond to the absorption by the welding powder sheath, and the inner region II corresponds to that of the core wire W. The substantial discontinuities of the absorption at the start and at the end of the core wire regions have great importance. Similar discontinuities at the start and at the end of the electrodes themselves, that is at the edges of the electrodes, are also important. The jumps of the absorption curves at these discontinuity points all occur over a practically zero time. For this reason, the value of the ionic currents $I_1$ and $I_2$ can readily be obtained from the absorption curves at the discontinuity points. In this way the start and the ends of the various regions can be defined.

Since the current value rises almost vertically in the proximity of the discontinuity points for the absorption curve, the determination of threshold values is not critical. That is fluctuations about a mean value of the order of up to 20 percent have no influence on the result of the measurements. According to one embodiment of the invention the most favorable threshold values $I_1$ and $I_2$ are determined for specific electrodes from a number of absorption curves in the measuring recorder 29. This then is used to adjust the comparator 28 at the terminals 43 and 44 to obtain automatic measurements of the mean eccentricity.

According to one embodiment of the invention, the X-ray source 21 and the ionization chamber 25 retain a fixed position. According to another embodiment of the invention, a measuring table (not shown) continuously displaces the X-ray source and the ionization chamber, which together form a measuring head, parallel to the electrode axes. Consequently, each measurement determines not only the eccentricity through one section of the electrodes but determines the average eccentricity of each electrode over its entire length.

As stated, the d-c amplifier 27 applies its output to a measuring recorder so the absorption curves corresponding to FIG. 4 are recorded. A determination is then made of the threshold values $I_1$ and $I_2$ suitable for the particular type of electrodes being manufactured by the apparatus 50. Once the threshold values have been determined, they are adjusted on the input 43 and 44 of comparator 28. The comparator 28 determines the times $T_1$ to $T_4$, as shown in FIG. 4, at which the amplified ionic current I passes through the preset current levels $I_1$ and $I_2$. During the intervals $T_1$ to $T_2$ the comparator 28 releases or actuates the up-count or forward-count of an up-down counter, or forward-backward counter 30. During the interval between time $T_3$ to $T_4$ the comparator 28 actuates the up-down counter 30 to count down. The counting direction is determined by the chronological order of the level $I_1$ and $I_2$. That is to say, when the order of currents is $I_1$ to $I_2$, the counter 30 counts up while for the inverted order $I_2$, $I_1$ causes the counter 30 to count down. When the ionic current thus drops below the level $I_1$, the counter 30 counts up. When the ionic current passes up through the current level $I_2$ the counter 30 counts down.

A pulse generator 26 whose rate responds to the speed of the conveyor belt 18 serves as the pulse frequency timer for the counter 30. Thus, no matter what the belt speed that is used, the operation of the counter 30 corresponds to that speed. Thus, fluctuations in the belt speed do not affect operation of the apparatus according to the invention.

The counter 30 thus substantially subtracts the number of pulses during the time interval $T_3$ to $T_4$ from the time interval $T_1$ to $T_2$. At the time $T_4$ the counter 30 thus indicates the difference in the number of pulses counted during these two intervals. This difference is proportional to the mass difference indicated by the equation (2). The counter 30 produces an output corresponding only to the absolute value of the difference. This prevents electrodes which have eccentricities extending in one direction from cancelling out the effects electrodes having eccentricities extending in the other direction. In fact it prevents the total result of all the measurements of the electrodes from becoming virtually zero. The counter accomplishes this absolute value output with a known logical decision element that reverses the measuring result after each electrode if the time between $T_3$ and $T_4$ is greater than the time between $T_1$ and $T_2$.

The comparator 31 compares the eccentricity determined for each electrode with a maximum admissible eccentricity entered at point 44 of this comparator. The comparator 31 excludes individual extreme eccentricities and passes the net eccentricity pulses from the counter 30, with the exception of those excluded, to an adder 33. The latter adds the eccentricity of the last electrode 22 whose measurement has not been rejected by the comparator 31, to those of previous eccentricities and stores the total in a storage device 38. An indicator 41 displays the content of the storage device 38.

It should be noted here that the counter is reset to zero after measuring each electrode. (Counter 30).

A counter 34 counts the number of electrodes whose measurements were rejected by the comparator 31 so as not to be used in determining the mean value. It also counts the value of the eccentricities being rejected and stores both figures in a storage device 39 whose content is displayed by an indicator 42. The extreme measurements rejected by the comparator 31 can arise from poorly manufactured electrodes, disturbances due to electrical interference pulses, or mechanically damaged electrodes. According to one embodiment of the invention, the counter 34 records a maximum number of nine electrodes. The elimination limit is 39 pulses which would correspond to an eccentricity of about 0.39 mm.

A counter 32 counts all the measured electrodes and stores them in a storage device 37. At the same time a comparator and control unit 35 compares the number of electrodes counted in the counter 32 with a preselected number N established by a preselector 36. The unit 35 actuates the storage devices 37, 38 and 39 to transfer their content to the indicators 40, 41 and 42 when the number N has been reached by the counter 32. Thus display by the indicators 40, 41 and 42 occurs only when the storages 37, 38 and 39 have reached their limit as determined by the control unit 35. The number of excluded electrodes is thus displayed in the indicator 42. The end sum of the errors of the averaged eccentricities is displayed in the indicator 41. The indicator 40 displays the total number N of the measured electrodes.

With a slight delay the adding device 37 and the counters 32 and 34 are then erased to be ready for the measurement of the next N number of electrodes. The content of the storage units 37, 38 and 39 are reset to accept the new values from the counter 32, adder 33 and counter 34. The measuring data are indicated during the entire measuring time of the next N electrodes. That is, if $N = 100$, a time of 2 to 3 seconds is available.

According to one embodiment of the invention, the indicators 40, 41 and 42 are composed of decoding units and digital indicating tubes. The measuring values can be used for additional statistical evaluation, like determination of the variance and averaging over far greater numbers.

According to another embodiment of the invention, the value indicated by the indicator 41 is transmitted electrically to the manufacturing apparatus 50 so as to adjust the apparatus and cause it to produce electrodes within closer tolerances where necessary. The values in indicators 40 and 42 are also transmitted to the apparatus 50 where they are combined with the value in indicator 40 to aid in the adjustment.

Apart from the d-c amplifier 27, the entire electronic evaluation system is composed of integrated circuit parts. The ionization chamber 25 is constructed specially with small electrode plate spacings so as to produce usable analog signals. The arrangement is thus very sensitive to mechanical vibrations of the electrode plates. Special mounts eliminate vibrations that may be transmitted from the belt to the ionization chamber. The amplifier 27 is a d-c amplifier with a field-effect transistor at the input stage.

According to one embodiment of the invention, the measuring recorder 29 is composed of a counter having a logic circuit rather than a display. These determine the intervals $T_1$ to $T_4$ and $T_2$ to $T_3$. The thresholds are then set at the optimum values when each interval $T_2$ to $T_3$ are determined. The thresholds are set at the optimum values when the interval $T_2$ to $T_3$ corresponds to the wire diameter and the interval $T_1$ to $T_4$ to the width of the diameter of the electrode reduced by the cone 23 of rays.

While embodiments of the invention has been described in detail, it will be obvious that the invention may be embodied otherwise without departing from its spirit.

What is climaed is:

1. The method of observing eccentricities of interior members relative to surrounding sheaths where said members and sheaths form assemblies, which comprises moving the assemblies sequentially through a beam emanating from an energy source and exhibiting different amounts of penetration through the members relative to the sheaths, for each assembly measuring the distance over which a sensor senses penetration through the sheath from the edge of the sheath to the member on the leading radial side of the member as the leading radial side of the sheath passes through the beam, for each assembly measuring the distance over which a sensor senses penetration through the sheath from the member to the edge of the sheath on the trailing radial side of the sheath as it passes through the beam, comparing the measurements on each radial side of the member, and comparisons. the absolute values of the cimparisons.

2. The method as in claim 1, further comprising counting the number of assemblies and stopping the comparison after a predetermined number of assemblies.

3. The method as in claim 1, wherein the amounts of penetration are measured by obtaining measures of the distance over which a sensor senses penetration through the sheath on the leading radial side of the interior member and on the trailing radial side of the interior member.

4. The method as in claim 3, wherein the distances are measured by counting time intervals whose length is based on the speed at which the assemblies are moved through the beam.

5. The method as in claim 1, wherein the distances are measured by establishing thresholds of penetration separating the penetration of the sheaths and the interior members.

6. The method as in claim 1, wherein the energy source is an X-ray, and wherein the penetration is measured by an ionization chamber that measures the absorption of the X-rays by the portions of the assemblies.

7. The method as in claim 6, wherein a first threshold is established to indicate that the absorption exceeds the medium surrounding the assemblies to thereby denote that the sheath is absorbing X-ray radiation, and a second higher absorption threshold is established to indicate that the interior member is passing under the source and absorbing the energy.

8. The method as in claim 1, wherein the assemblies are composed of welding rods and the central members are composed of welding wires.

9. The method as in claim 1, wherein after each comparison of the measurements of the penetration of the leading edge and the trailing edge the measurements are erased.

10. The method as in claim 2, wherein after the assemblies are counted and the comparisons stopped after a predetermined number of assemblies the addition is erased.

11. The method as in claim 1, wherein the assemblies are moved with a selectable feed velocity.

12. The method as in claim 1, wherein the rods are arrayed parallel to each other and moved transverse to their longitudinal direction and transverse to the direction of the beam.

13. The method as in claim 1, further comprising comparing each comparison with a standard maximum value and eliminating measurements exceeding the maximum value so as not to be included in the total of the adding step.

14. An apparatus for observing eccentricities of interior members relative to sheaths, wherein the interior members and sheaths form assemblies, comprising energy source means for forming a beam exhibiting different amounts of penetration through the member relative to the sheath, moving means for moving the beam and a plurality of the assemblies relative to each other so as to pass the assemblies through the beam, sensing means in the path of the beam for sensing when the beam is passing through the sheath on the leading and then the trailing side of the member, measuring means connected to said sensing means for comparing the distance over which said sensor means senses penetration through the sheath on the leading radial side of the member from the edge of the sheath to the member with the distance over which said sensor means senses penetration through the sheath on the trailing side of the member from the member to the edge of the sheath, and adding means connected to said measuring means for adding the absolute values of the compared measurements.

15. An apparatus as in claim 14, wherein the assemblies are elongated welding rods and the interior members are wires, and wherein said moving means move the rods so they exhibit a moving radial component relative to the beam.

16. An apparatus as in claim 15, wherein said moving means includes a belt carrying the rods transverse to the direction of motion.

17. An apparatus as in claim 16, wherein said measuring means includes pulse generator measn responsive to the speed of said belt for producing pulses and an up-down counter for counting up during the pulses when their leading radial side of each sheath passes through the beam and counting down when the trailing radial side of the sheath passes through the beam, and conversion means in said up-down counter for producing a value indicative of the absolute value in the counter after each measurement of both radial sides of the sheath.

18. An apparatus as in claim 14, wherein said measuring means includes erase means for erasing each measurement after each sensing of each assembly.

19. An apparatus as in claim 17, wherein said measuring means includes erase means for erasing each absolute value after said adding means has added the absolute values.

20. An apparatus as in claim 19, wherein said measuring means includes preselector means connected to said counter and said adding means for counting the number of rods passing through the beam and comparing them with a given number and then stopping the addition in said adding means when the given number is exceeded.

21. An apparatus as in claim 20, wherein said adding means includes an adder, storage means for storing the added values and ending addition in response to said preselector means, and indicator means.

22. An apparatus as in claim 14, wherein said sensing means include threshold forming means for establishing thresholds indicative of sensed values corresponding to the sheath entering the beam, the member entering the beam, the member leaving the beam, and the sheath leaving the beam; and wherein said measuring means measures the penetration time from the threshold occurring when the sheath enters the beam to the time when the member enters the beam, and compares it with the time from the threshold at which the member leaves the beam and the sheath leaves the beam.

23. An apparatus as in claim 14, wherein said source means includes an X-ray machine, and wherein said sensing means includes an ionization chamber.

24. An apparatus as in claim 23, wherein the beam is such as to penetrate the sheath and the member so as to form step functions at the output of said measuring means as the sheath enters the beam, as the member enters the beam, as the member leaves the beam and as the sheath leaves the beam, and wherein the thresholds are selected at the step functions.

25. An apparatus as in claim 24, wherein logic means measure the step functions.

26. An apparatus as in claim 14, wherein said measuring means includes comparator means for comparing the individual absolute values with a given maximum value and for shunting values in excess of the maximum values away from the adding means so that the excessive values are not added.

27. An apparatus as in claim 14, wherein said sensing means includes an ionization chamber, said ionization chamber including mounting means for absorbing vibrations.

28. A method as in claim 1, wherein the beam has an effective diameter less than the distances to be measured.

29. A method as in claim 7, wherein the beam has an effective diameter less than the distances to be measured.

30. An apparatus as in claim 14, wherein said energy source means produces the beam so its diameter is less than the distances to be measured.

31. An apparatus as in claim 24, wherein said energy source means produces the beam so its diameter is less than the distances to be measured.

32. A method as in claim 1, wherein the beam exhibits one range of penetration through the sheaths and a second range through the members.

33. An apparatus as in claim 14, wherein said energy source means forms a beam that exhibits one range of penetration through the sheaths and another range of penetration through the members.

* * * * *